United States Patent [19]
Metz

[11] 3,759,151
[45] Sept. 18, 1973

[54] INSPECTION CAMERA
[76] Inventor: Raymond W. Metz, P.O. Box 271, Norco, Calif. 91760
[22] Filed: Sept. 21, 1971
[21] Appl. No.: 182,374

[52] U.S. Cl. ................................. 95/11, 356/241
[51] Int. Cl. ..................... G03b 37/00, G01n 21/16
[58] Field of Search ...................... 95/11; 356/241

[56] References Cited
UNITED STATES PATENTS
1,658,537  2/1928  Reinhold ........................ 95/11 HC
3,244,085  5/1966  Pulfer ............................ 95/11 HC
1,470,708  10/1923  Blum ................................ 95/31

FOREIGN PATENTS OR APPLICATIONS
67,017  11/1943  Norway ............................. 356/241

Primary Examiner—John M. Horan
Attorney—Ronald L. Juniper

[57] ABSTRACT

A camera constructed to photograph the interior of aircraft engine cylinders through spark plug holes which includes a light-sealed housing angled to focus the interior cylinder image. The camera includes a flash reflector tunnel which illuminates the specific area being photographed.

3 Claims, 5 Drawing Figures

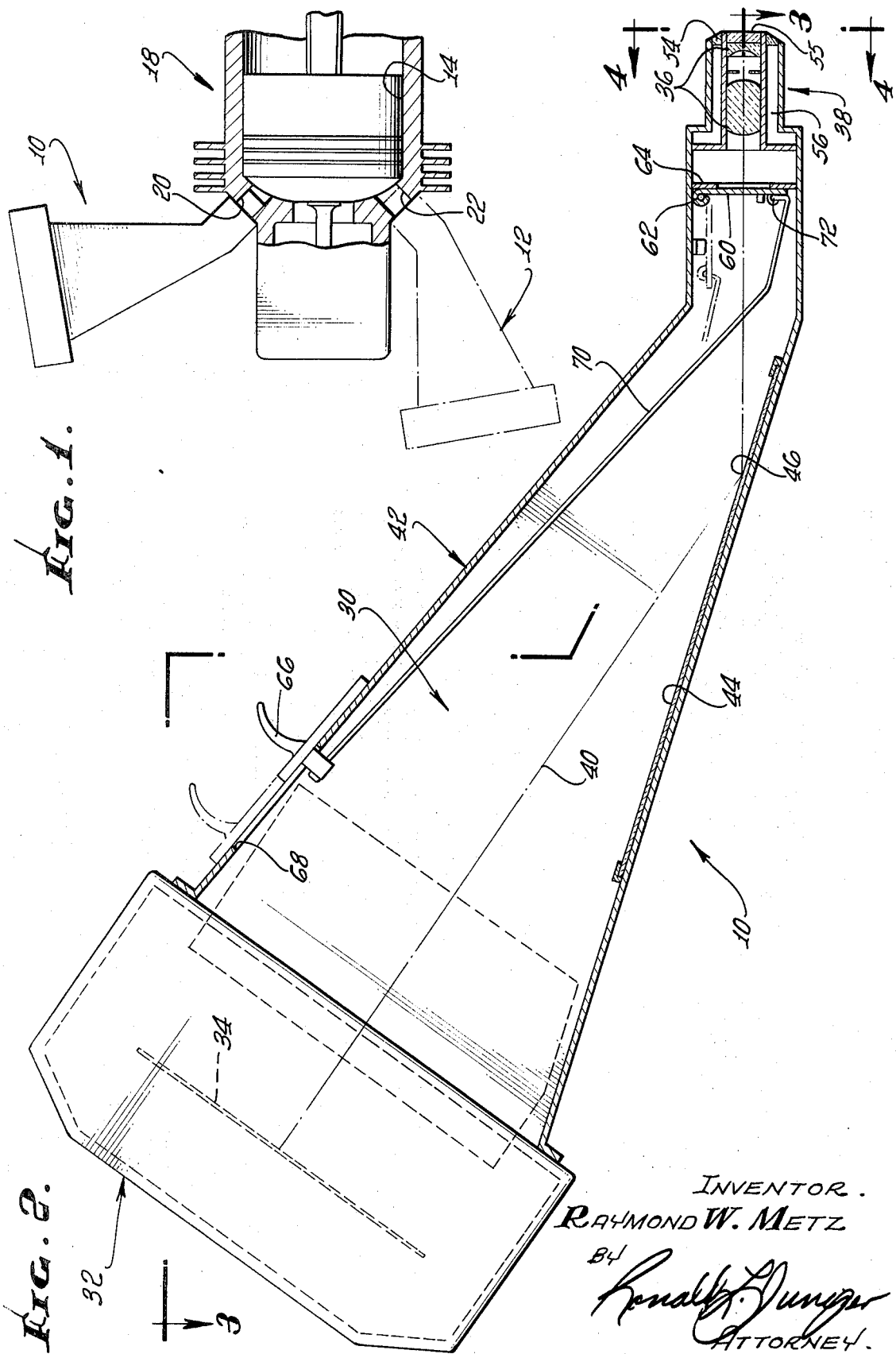

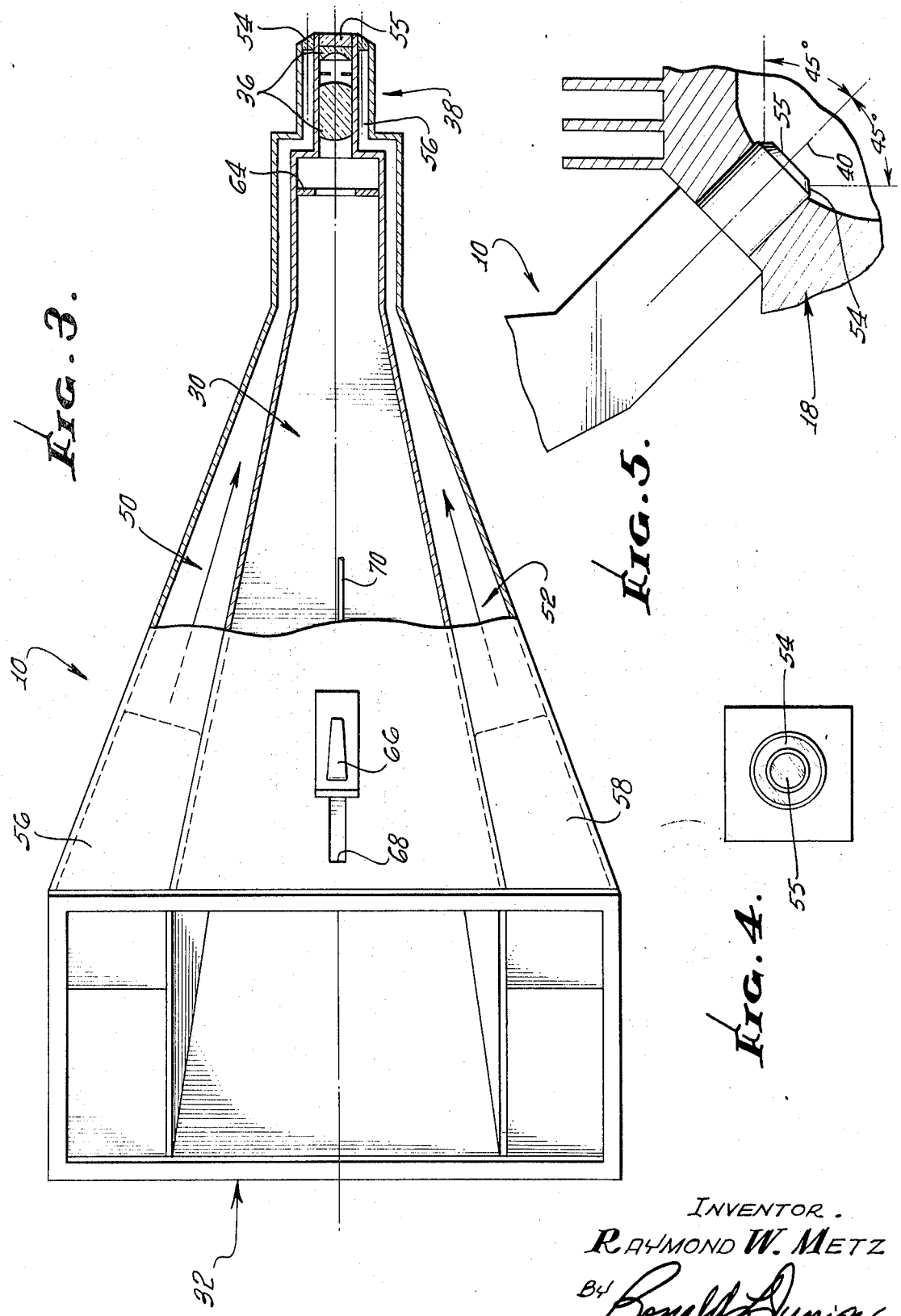

INSPECTION CAMERA

BACKGROUND OF THE INVENTION

Broken piston rings in aircraft engines often go undetected until substantial damage to the cylinder walls has taken place. It is then necessary to replace the entire cylinder, making repairs more costly than it would have been had the problem been detected early enough. The problem is acute in newly re-manufactured engines. There, compression would not yet be up to normal during the breakin period. A broken ring due to faulty installtion could go undetected for perhaps 100 hours of operation, during which time a cylinder would become severly scored.

At the present time the condition of rings and cylinders can be indirectly tested by measuring compression or the ability of the cylinder to retain a given amount of air pressure. If the cylinder is not air tight to the prescribed amount, the trouble is not pinpointed to ring failure. It could be one of the following problems:
1. Faulty valve seating
2. Cracked piston
3. Broekn rings
4. Worn rings A second method of inspection available at present is to make a visual inspection by utilizing an optical device called a bore scope. This device allows an operator to visually scan the cylinder walls through a limited field of view. The disadvantage of this device, in the case where there is doubt as to the cause of the scratch, is that one man views a potential scratch due to ring failure and makes a judgement to disassemble the cylinder or to watch it for awhile for a worsening of the condition. In viewing the scratch a second time at a later date, it may be difficult to determine the amount of deterioration since the previous inspection has to be remembered.

Therefore, to overcome these problems, it is a primary object of this invention to provide a special camera to permanently record the condition of the cylinder walls after periods of operation. A piston ring failure then could be detected when it does no more damage than produce a fine scratch in the wall. Repair would then amount to no more than the relatively minor operation of replacing rings and not the entire cylinder.

A further object of this invention is to provide a camera especially constructed to photograph accurately the interior surface of aircraft engine cylinder walls which incorporates a light source sufficient to give correct exposure and a lens to provide a specific field of view.

Thus an inspection camera within the purview of this invention to overcome these disadvantages of the prior art includes a lens carrying structure constructed to matingly fit through the cylindrical intercon of a spark plug hole. A photographic chamber within which the lens is mounted includes the film in a plane upon which the lens can focus. In some forms the field of view desired requires angling the chamber and positioning a mirror therein to reflect the object image in the plane of the film. In order to properly light, the cylinder interior flash units are carried on the sides of the camera chamber which direct their light through enclosed reflective flash tunnels so that the light is emitted through a diffuser ring surrounding the lens. The light is thereby directed exactly on the objects the lens is focused on, and in the case of cylinder interiors, covers a field of view and area virtually impossible to photograph with conventional cameras.

DESCRIPTION OF THE DRAWINGS

FIG. 1 is a schematic view of the invention illustrating how it may be used to photograph the interior of an aircraft engine cylinder through the spark plug holes.

FIG. 2 is a longitudinally sectioned view of an embodiment of this invention showing the angled housing structure relative to the axis of the photographic image and the place of the film.

FIG. 3 is a longitudinally sectioned view taken through 3 — 3 in FIG. 2 showing the flash reflector tunnels in this embodiment on both sides of the housing structure.

FIG. 4 is a cross-sectional end view taken through 4 — 4 in FIG. 3 showing the lens end of the camera.

FIG. 5 is a fragmented, longitudinally sectioned view taken through 5 — 5 in FIG. 3 showing the insertion of the camera lens through a spark plug hole.

DESCRIPTION OF THE INVENTION

Referring to FIG. 1 of the drawings, a typical camera 10 covered by this invention is constructed so that it can photograph the cylinder interior surfaces 14 of an aircraft engine 18 by placing the camera so as to receive images through the spark plug holes 20 and 22. The same camera, designated 12, can be used here by moving it from one spark plug hole to the other so as to encompass the desired field of view within an engine cylinder.

An embodiment of a camera in accordance with this invention includes a funnel-shaped photographic chamber 30 enclosing at its larger end 32 a photographic film 34 held in a plane on which images received through the lens 36, carried within the cylindrical small end 38 of the chamber 30, can be focused. Because of the particular shape of the interior surfaces 14 of an aircraft engine cylinder and the relative location of the spark plug holes 20 and 22 through which the end 38 is inserted, the image pathway 40 is folded within the chamber 30 to photograph the desired field of view.

This folding of the image pathway 40 is achieved through bending the center of the chamber 30 by angling its housing 42 and placing a mirror 44 along the angled sidewall so positioned that the image pathway 40 received through lens 36 is reflected at the precise orientation point 46 which will focus it on film 34 as shown in FIG. 2.

A type of film 34 which has been found suitable for use in this invention is Polaroid type black and white which has a very "fast" A.S.A. rating. This film 34 then can be inserted in the larger end 32 of the camera as part of a Polaroid film pack.

Since the interior of the engine cylinders within which photographs are intended to be taken with this camera are ordinarily quite dark, supplementary sources of light are usually required. However, in order to accurately photograph cylinder interiors the ordinary light sources cannot be placed to provide the desired even lighting, in the same field of view, as that taken by the lens of this camera. Thus, special lighting tunnels 50 and 52 are positioned along the outside of chamber 30, as shown in FIG. 3, to emit light at their common termination in end 38 through a translucent diffuser ring 54 which surrounds a circular piece of glass 55 forward of the lens 36.

The light sources 56 and 58 for these reflector tunnels 50 and 52, respectively, can be conventional electronic flash units such as Bauer Model Number 160 Ultrablitz units placed so that emitted light is directed down the tunnels toward light diffuser ring 54. In order to maximize the efficiency of the emitted light, the tunnel walls are preferably lined with reflective material. To provide as nearly even lighting as possible, the tunnels 50 and 52 on two opposite sides of chamber 30, join near end 38 to form a common tunnel portion 56 surrounding lens 36.

The lens 36 is preferably structured to provide a 45° field of view on all sides of the central axis of the image pathway 40 as shown in FIG. 5. An example of a lens which can be used for this purpose is comprised of three elements having the following characteristics wherein the Element I is nearest the object, Element II is intermediate, and Element III is nearest the film.

E. C. I. CAMERA OBJECTIVE

| Element | Radius | Thickness | Glass | Clear Aperture |
|---|---|---|---|---|
| I | Infinity | 0.05 | 517642 | 0.29 |
|   | Infinity | 0.045 |  | 0.22 |
| II | −0.500 | 0.025 | 648339 | 0.16 |
|   | 0.2258 | 0.1075 |  | 0.12 |
| III | −1.783 | 0.573 | 734517 | 0.05 (Stop Diameter) |
|   | −0.434 |  |  | 0.29 |

A normally closed spring-loaded shutter 60 is hingedly mounted on a pivot pin 62 attached to an interior side wall of housing 42 adjacent to a fixed aperture iris 64 mounted transversely within the chamber 30 near its smaller end 38. The shutter 60 is opened by pulling a trigger 66, slidably mounted for longitudinal movement within a slot 68 in the side of housing 42 near the larger end 32, which, in turn, pulls the connected lever 70 to open the interconnected edge 72 of shutter 60. When so actuated, the trigger 66 and shutter 60 are moved to the dotted line positions shown in FIG. 2.

At the same time as the trigger 66 is pulled to open the shutter 60, an electrical circuit (not shown) is closed to simultaneously actuate the electronic flash units thereby providing the required amount of light to produce an image on the film 34.

Though a single form of this invention has been described here, this is for illustrative purposes only so as to show the advantages of this invention. Specific variations suggested by this description of the invention are intended to be comprehended by it as within the spirit of the development as defined by the scope of the following claims.

I claim:

1. An inspection camera including: a funnel-shaped, light-sealed, photographic chamber having an open small end with an exterior cylindrical shape adapted to be matingly fitted on an engine spark plug hole, and a large end; photographic film carried in a plane in said chamber large end on which images received through said lens means can be focused; said photographic chamber being angled between its small end and its large end so that the axis of the image pathway received through said lens means strikes an interior side wall and a mirror is mounted on said interior side wall positioned to reflect images received through said lens means onto the plane of the photographic film; a translucent diffuser ring surrounding said lens means adjacent to the open small end of said chamber; at least one enclosed light reflector tunnel connected with said diffuser ring; photographic lighting means mounted within said light reflector tunnel positioned to provide illumination through said diffusor ring which is directed to flare out substantially evenly around the axis of the image pathway through the lens means toward the object area being photographed; a shutter means within said photographic chamber normally blocking light entering said open small end; trigger means for selectively opening said shutter for predetermined amounts of time; and electrical circuits means connecting said trigger means and said photographic lighting means to synchronize the shutter and the lighting means.

2. An inspection camera as defined in claim 1 wherein there are two reflector tunnels which are mounted on opposite sides of the photographic chamber and interconnected to said diffuser ring by means of a common tunnel portion.

3. An inspection camera as defined in claim 2 wherein the lens means is adapted to provide an approximately 45° field of view on all sides of the central axis of the image pathway.

* * * * *